Sept. 4, 1962  E. A. HENRY ET AL  3,052,428
AIRCRAFT AUTOMATIC PILOT
Filed Aug. 6, 1957  2 Sheets-Sheet 1
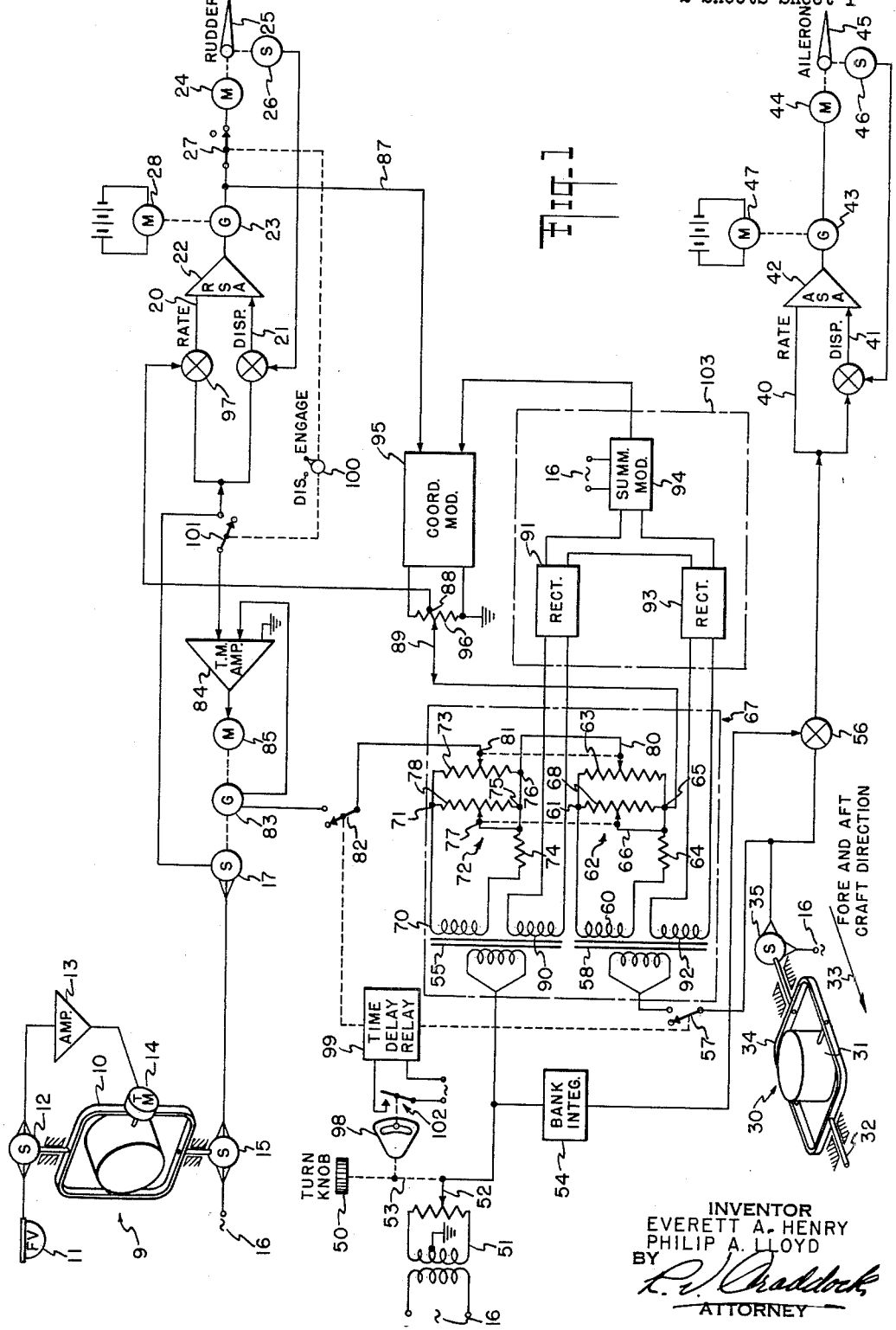
INVENTOR
EVERETT A. HENRY
PHILIP A. LLOYD
BY
ATTORNEY

INVENTORS
EVERETT A. HENRY
PHILIP A. LLOYD
BY
ATTORNEY

United States Patent Office 3,052,428
Patented Sept. 4, 1962

3,052,428
AIRCRAFT AUTOMATIC PILOT
Everett A. Henry, Northport, N.Y., and Philip A. Lloyd, Salt Lake City, Utah, assignors to Sperry Rand Corporation (Sperry Gyroscope Company Division), Great Neck, N.Y., a corporation of Delaware
Filed Aug. 6, 1957, Ser. No. 676,648
8 Claims. (Cl. 244—77)

The present invention relates to improvements in aircraft automatic pilots and, more particularly, to automatic pilots including means for executing co-ordinated turns.

Automatic pilots for aircraft generally include a directional gyroscope for establishing a stable heading reference, a vertical gyroscope for establishing a stable vertical reference, and servo or positional control system responsive to the indications of the gyros and operative through suitable relays or amplifiers to control the rudder, ailerons and elevators in a manner to stabilize the aircraft in some predetermined heading and attitude.

It is desirable to be able to employ the automatic pilot not merely for stabilizing the aircraft in straight flight but also for making turns under automatic control. Execution of perfect or co-ordinated turns under automatic control is a problem of considerable difficulty, especially when the wide range of rate of turn and air speed in modern aircraft is considered. Turn co-ordination requires a continuous correlation throughout the turn of three variables: rate of turn, air speed and bank angle. Unless these variables are correctly correlated, the aircraft will sideslip or skid for reasons well known to those skilled in the art. These conditions not only make for discomfort to the passengers, but also if they are not corrected, may result in putting the aircraft in a dangerous attitude. It is particularly advantageous to maintain the craft in a co-ordinated condition as early as possible after initiating the turn and to maintain that condition until the plane has ceased turning and is in a "wings-level" attitude.

The present invention is an improvement over the automatic pilot systems shown in Patent No. 2,567,922 issued on September 18, 1951 to R. S. Brannin et al. entitled "Automatic Pilot for Aircraft" and in Patent No. 2,896,883 issued July 28, 1959 to R. E. Andeen entitled "Aircraft Automatic Pilot," both of which are assigned to the same assignee as the present invention.

In proir art turn controls, the turn signal is obtained from the command signal developed by positioning the turn knob on the pilot's flight controller. Under rapid turn entry conditions, an appreciable rudder displacement can occur before a co-ordination correction signal is developed to correct the excessive rudder displacement. In aircraft with low inherent rate of roll or limited servo torque, this rudder displacement can rapidly become excessive during the beginning of the turn resulting in poor turn entry and delayed co-ordination.

Similarly, if the turn command signal is rapidly removed after a turn is in process, the turn motor-generator coasts to a halt at an indeterminate rate since only the braking component of the shorted motor field and friction serves to decelerate the motor. This braking component is influenced by temperature, lubricants and service life of the motor-generator. During the turn recovery and roll out interval, no co-ordination correction is in effect since the co-ordination signal is zero and the motor field is shorted out. Variations in coast time of the motor therefore makes accurate heading selection a difficult proposition.

By manipulating the turn knob of prior art flight controllers, a step function turn command signal may be introduced into the rudder channel of previous automatic pilots. When this signal is applied to the rudder rate channel, it results in rapidly positioning the rudder thereby causing the plane to maneuver violently. This rudder "rate-kick," as it is known, causes unnecessary strain on the airframe structure as well as discomfort to passengers.

It is an object of the present invention therefore to provide an automatic pilot for aircraft with improved turn co-ordination means.

A further object of the invention is to provide an automatic pilot for aircraft with means for rapidly initiating co-ordination during turn maneuvers.

Another object of the present invention is to provide an automatic pilot for aircraft with means for maintaining a co-ordinated condition during turns until the selected heading has been achieved.

Another object of the present invention is to provide an automatic pilot for aircraft having means for rapidly and accurately aproaching and maintaining a desired heading.

An additional object of the present invention is to provide a means for summing and modulating at least two input signals whereby the resulting signal is of constant phase or polarity but variable in amplitude in accordance with the combined amplitude of said input signals.

A further object of the present invention is to provide a means for summing two or more input signals whereby the input signal channels remain electrically isolated from each other.

These and other objects of the present invention are achieved by the improved turn co-ordination means of the present invention wherein the turn command signal and the co-ordination reference signal are derived from both the positioning of the turn knob and the roll attitude of the aircraft. A selector switch is incorporated in the co-ordination system to establish the desired ratio between the turn command signal and the roll attitude signal sources. Since the turn rate in the improved turn co-ordination means is controlled by dual sources, i.e., turn command signal and roll attitude signal, considerably less rudder displacement is developed on turn entries before the co-ordination reference signal becomes effective. In addition, the turn rate is gradually increased in accordance with the increase in aircraft attitude rather than as a step input function of the turn command knob movement. By this arrangement, rudder "rate-kick" is minimized. On rolling out of the turn, instead of shorting out the turn motor-generator and decreasing the turn signal rapidly to zero, the roll attitude signal remains effective for a predetermined time delay, i.e., sufficient to allow the aircraft to return to a "wings-level" condition. The time delay allows the turn motor to be decelerated by the motor-generator amplifier system at a rate determined by the roll rate of the aircraft. When the wings are level, the system locks in place until the turn knob is moved again. The co-ordination reference signal is also controlled by a dual signal source and co-ordination control remains during the entire roll out. Thus, co-ordination is achieved at the initiation of turn entry and precise heading changes may be established by returning the turn knob to detent at the desired heading to achieve accurate heading control with a minimum of rudder "rate-kick." Sufficient lead rudder may be established to compensate for the adverse yaw effect of the various aircraft.

These and other objects of the present invention will be apparent to those skilled in the art upon referring to the following description when read in connection with the accompanying drawings, wherein like reference characters indicate like elements, in which:

FIG. 1 is a diagrammatic view showing the elements of an automatic pilot for aircraft constructed in accordance with an embodiment of the present invention. For purposes of illustration, only the aileron and rudder control channels of the improved turn co-ordination automatic pilot are illustrated;

Figure 2:
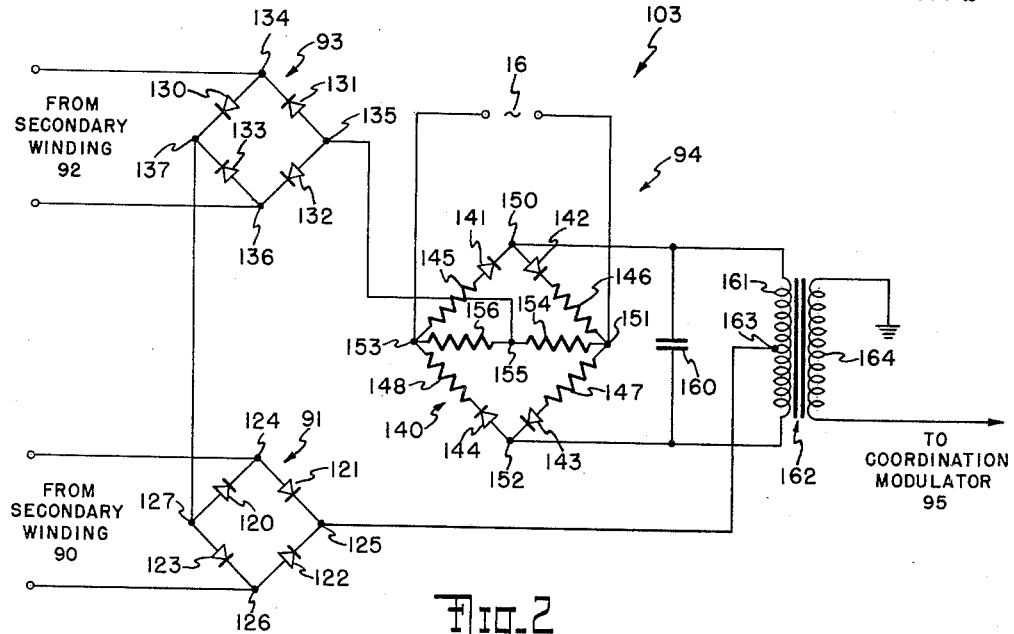
FIG. 2 is a schematic wiring diagram showing an embodiment of the rectifiers and summing modulator of FIG. 1; and, FIG. 3 is a schematic wiring diagram showing an embodiment of the co-ordination modulator of FIG. 1.

As shown in FIG. 1, the improved automatic pilot turn co-ordination system includes a directional reference means 9 such as a gyro magnetic azimuth reference device that comprises a directional gyro 10 slaved to a flux valve 11. Flux valve synchro 12 provides a signal representative of the error between the heading indications of flux valve 11 and gyro 10. This error signal is applied to amplifier 13 which drives slaving torque motor 14 to position the directional gyro 10 in accordance with the signals from the flux valve 11. The directional reference means 9 also includes a heading synchro transmitter 15 having a rotor portion, not shown, connected to the stabilized vertical ring of the directional gyro 10 in a conventional manner. The stator portion of heading synchro 15 is fixed to the craft and moves with the craft in turns. A suitable source of alternating current 16 energizes the rotor portion of synchro 15.

The aforementioned directional reference means 9 is in the rudder channel of the automatic pilot. The stator portion of heading synchro 15 of means 9 is electrically connected to the stator portion of rudder synchro 17. The output of rudder synchro 17 is connected to the rate channel 20 and to the displacement channel 21 of phase sensitive rudder servo amplifier 22. The output of the rudder servo amplifier 22 is connected to control rudder generator 23 which, in turn, controls rudder servomotor 24 via contact arm 27. Motor 28 drives generator 23 in conventional Ward-Leonard motor-generator set fashion. Motor 24 is suitably connected to drive rudder 25. Connected to rudder 25 is rudder repeatback synchro 26 that provides a repeatback signal indicative of the magnitude and sense of the rudder displacement to the displacement channel 21 of rudder servo amplifier 22.

Also included in the automatic pilot is a pitch and roll or bank reference means 30 to provide stabilization and control for the elevators, not shown, and for the ailerons 45 of the craft. The pitch and bank reference means 30 may comprise a conventional vertical gyro 31 having a major axis 32 parallel to or coincident with the fore-and-aft axis of the craft as represented by arrow 33 designated as fore-and-aft craft direction. The minor axis 34 of gyro 31 is normally horizontal and parallel to or coincident with the pitch of athwartship axis of the craft. The gyroscopic rotor of vertical gyro 31 is mounted to spin about a substantially vertical axis in a manner well known in the art. Any suitable means may be provided as an erecting device for the described type of vertical gyro 31. The roll synchro 35 has a rotor portion, not shown, connected to one of the trunnions of the vertical gyro 31 that lies along the major axis 32. The stator portion of synchro 35 is fixed to the craft. A suitable source of alternating current 16 is connected to the rotor portion of synchro 35. The stator portion of roll synchro 35 is connected to provide an output indicative of bank angle via summing circuit 56 to the rate channel 40 and displacement channel 41 of phase sensitive aileron servo amplifier 42 and also to provide an output via contact arm 57 to bank angle transformer 58. The output of aileron servo amplifier 42 is connected to control aileron generator 43 which in turn is connected to control aileron servomotor 44. Motor 47 drives generator 43 in conventional Ward-Leonard motor-generator fashion. Aileron motor 44 is connected to position the aileron control surfaces 45 of the aircraft. Repeatback synchro 46 is connected to ailerons 45 to provide a repeatback signal indicative of the magnitude and sense of the displacement of the ailerons 45 to the displacement channel 41 of aileron servo amplifier 42. In a conventional manner, pitch and roll attitude changes may be introduced via pitch and roll knobs, not shown.

The present invention includes novel turn co-ordinating means in the automatic pilot including means operable to provide a turn control command signal in accordance with the manipulation of a turn control knob 50 that may be mounted, for example, on a flight controller, not shown. Knob 50 is connected to a turn signal generating means which may be in the form of a potentiometer 51 that is energized from a suitable source of alternating potential 16. The slider arm 52 of potentiometer 51 is connected to the turn knob 50 by suitable shafting 53 in such a manner as to provide a turn command signal in accordance with the movement of the knob 50 from the null position. The amplitude of the turn signal is proportional to the amount of the turn knob rotation while the phase of the turn signal is dependent upon the direction of rotation thereof. An index, not shown, may be associated with the turn knob 50 and may be calibrated in terms of, for example, bank angle. The output of the turn control signal generator 51 is connected via slider arm 52 to bank integrator 54 and to the primary of turn transformer 55. The primary function of the bank integrator 54 is to insure smooth banking of the aircraft regardless of uneven turning of the turn knob 50 which may be accomplished, for example, by a demodulator, integrator and modulator network. The output of bank integrator 54 is connected to summing circuit 56. Roll synchro 35 is connected via contact arm 57 to the primary of bank angle transformer 58.

Turn transformer 55, bank angle transformer 58, and associated circuitry to be described comprise a combining means 67 for combining preselected proportions of the turn command signal, bank angle signal and the co-ordination reference signal, the latter to be described. One end of secondary winding 60 of bank angle transformer 58 is connected at junction 61 to one end of resistor 68 of voltage divider 62 and to one end of voltage divider 63. The other end of secondary winding 60 is connected to one end of resistor 64 of voltage divider 62. The other ends of resistors 64 and 68 are connected together at junction 65 to comprise voltage divider 62. The adjustable tap 66 of resistor 68 is connected to junction 65 to tap off a predetermined amount of the bank angle signal. The other end of voltage divider 63 is also connected to junction 65.

One end of secondary winding 70 of turn transformer 55 is connected at junction 71 to one end of resistor 78 of voltage divider 72 and to one end of voltage divider 73. The other end of secondary winding 70 is connected to one end of resistor 74 of voltage divider 72. The other ends of resistors 74 and 78 are connected together at junction 75 to comprise voltage divider 72. The adjustable tap 77 of resistor 78 is connected to junction 75 to provide a preselected amount of the turn signal. The other end of voltage divider 73 is also connected to junction 75. The adjustable taps 66 and 77 of voltage dividers 62 and 72, respectively are ganged together. Adjustable tap 80 of voltage divider 63 is connected to junction 76. The adjustable taps 80 and 81 of voltage dividers 63 and 73, respectively, are ganged together. Adjustable tap 81 of voltage divider 73 is connected via contact arm 82 to one side of the control field, not shown, of turn generator 83; the other side of the control field of turn generator 83 is connected to the input of turn motor amplifier 84. Turn generator 83 supplies an output having an amplitude depending upon the speed of rotation and a phase depending upon the direction of rotation. The output from turn generator 83 is connected to the input of turn motor amplifier 84 in feedback fashion for purposes of speed control and rate stabilization. Turn motor amplifier 84 is connected to turn motor 85 which, in turn, is connected to drive turn generator 83 and the rotor, not shown, of rudder synchro 17 through suitable gearing.

The other secondary winding 90 of turn transformer 55 is connected to rectifier 91. The other secondary winding 92 of bank angle transformer 58 is connected to rectifier 93. Rectifiers 91 and 93 may be full wave bridge rectifiers for converting the alternating current input from windings 90 and 92 to direct current signals of a magnitude corresponding to the turn signal and bank angle signal, respectively, and of a constant polarity. The rectifiers 91 and 93 are connected together and the output of rectifiers 91 and 93 are connected to summing modulator 94 which is provided with a suitable source of alternating potential 16 in a manner to be described in detail with respect to FIG. 2. Summing modulator 94 may be a ring modulator of a known type that sums the signals from rectifiers 91 and 93 and modulates them to a suitable alternating signal having a constant phase. The output of summing modulator 94 is connected to co-ordination modulator 95. The armature voltage output of rudder generator 23 also provides an input to co-ordination modulator 95 via lead 87. The primary function of the co-ordination modulator 95 is to co-ordinate automatically all turns made under varying combinations of airspeed and bank angle in a manner to be described in detail with respect to FIG. 3. The output of co-ordination modulator 95 is a co-ordination reference signal that is connected across voltage divider 96. A suitable proportion of the co-ordination reference signal across voltage divider 96 is connected in repeatback fashion by way of tap 88 to the rate channel 20 of rudder amplifier 22 via summing circuit 97. A preselected proportion of the co-ordination reference signal across voltage divider 96 is also connected to junction 65 by way of adjustable tap 89.

The shaft 53 of turn knob 50 is connected to a suitable detent cam device 98 to open or close contact arms 57 and 82 as desired via switch 102 and time delay relay 99, the operation of which will be described. Rudder engage knob 100 is connected to position contact arms 27 and 101 to selectively provide a connection between rudder generator 23 and motor 24 and rudder synchro 17 and turn motor amplifier 84 for yaw synchronization purposes in a manner to be described.

In the operation of the system shown in FIG. 1, deviations of the aircraft from the reference position about the yaw axis will be detected by the directional reference means 9 with the heading synchro 15 providing a signal to the rudder synchro 17 since the rotor of the heading synchro 15 is stabilized about the yaw axis by directional gyro 10 while the stator is fixed to the aircraft. The stator of the rudder synchro 17 is also fixed to the aircraft while its rotor is controlled by the operation of turn motor 85. Initially, with rudder engage knob 100 in the "disengage" position and contact arm 101 closed, the synchros 15 and 17 will be aligned by electrically detecting the angular difference between the heading and rudder synchros 15 and 17, respectively and driving the rotor of the rudder synchro 17 to the aligned position by means of the turn motor amplifier 84 and turn motor 85. This automatic yaw synchronization will be continuous while the rudder 25 is disengaged from the automatic pilot by means of the rudder engage knob 100.

With the rudder engage knob 100 in the "engage" position, rudder synchro 17 is disengaged from the turn motor amplifier 84 and provides a signal into the rate and displacement channels 20 and 21, respectively, of the rudder amplifier 22 to the rudder motor 24 thereby producing stabilization about the aircraft's yaw axis.

When the aircraft turns about its azimuth axis or yaws, heading synchro 15 provides a signal in accordance with the displacement of the craft from a preselected heading. With the craft on the preselected heading, synchro 15 provides a null input to the automatic pilot system. Departure of the craft from the preselected heading results in an output from heading synchro 15 whose magnitude depends on the extent of the departure and whose phase depends on the sense of the motion of the craft away from the established reference. The output of synchro 15 is transmitted to the rate and displacement channels 20 and 21, respectively, of rudder amlifier 22 via rudder synchro 17. Rudder synchro 17 does not provide any additional input to amplifier 22 unless the craft is in a commanded turn in a manner to be described. When there is no turn being commanded, generator 23 is controlled in accordance with the output of amplifier 22. Motor 24 is controlled in accordance with the generator output to position rudder 25 in accordance therewith while synchro 26 provides a position repeatback signal in a conventional manner.

Similarly, bank reference means 30 proves stabilization and control signals for the ailerons of the craft. When the aircraft rolls about its fore-and-aft or bank axis, roll synchro 35 provides an output signal having a magnitude proportional to the bank angle and a phase in accordance with the sense of the craft's departure from a level condition about the bank axis. The output signal from roll synchro 35, when contact arm 57 is open, is fed only to the rate and displacement channels 40 and 41, respectively, of aileron amplifier 42. The output of amplifier 42 controls generator 43 and motor 44 to position ailerons 45 in a manner well known in the art. Synchro 46 provides a position feedback signal to the input of amplifier 42.

The elevator channel of the automatic pilot is not shown but it will be understood that such a channel is usually provided in the system. The elevator channel operates in a command turn by adjustment of the elevators of the craft so as to maintain the same vertical component of lift of the craft during the turn as in level flight. By this means, the relationship between bank angle, craft velocity, craft rate of turn, and acceleration of gravity, as set forth in detail in the aforementioned Patent No. 2,567,922, is maintained and turns of the craft at different bank angles and air speed are co-ordinated.

When it is desired to make a turn, a turn command signal is initiated by rotating the turn knob 50. The turn command signal generated in potentiometer 51 depends upon the relative rotation of turn knob 50 and the magnitude thereof as previously explained. This turn command signal is applied to the bank integrator 54. The output of the bank integrator 54 is applied via summing circuit 56 to the input of the rate and displacement channels 40 and 41, respectively, of aileron amplifier 42. As the aircraft is displaced from its original roll attitude, a signal proportional to bank angle will be originated by the roll synchro 35. When the signal from the bank integrator 54 and the signal from the roll synchro 35 are equal, the aileron servo amplifier input will be zero, thereby allowing the repeatback synchro 46 to return the ailerons 45 to a neutral position. The bank angle will then be established and will be proportional to the turn signal applied.

The aforementioned paragraph describes a conventional manner of introducing signals to command a turn. Thus, upon initiating a turn, the turn knob signal commands a certain bank angle and, at a particular airspeed, a certain turn rate. In certain aircraft, particularly those with an inherent low rate of roll characteristic or where the maximum aileron servo force available does not permit a rapid roll rate, a serious problem of turn entry co-ordination exists. Due to the small automatic pilot-controlled aileron motion, the aircraft assumes a low rate of roll thereby allowing an appreciable time lag before the aircraft achieves the commanded bank angle and turning rate.

During this turn entry period, the rudder channel signal, i.e., the heading synchro 15 and rudder synchro 17 induced positional error signal, results in a stand-off rudder position causing undesirable sideslip resulting in a miscoordinated turn entry condition. An additional problem is caused by the rapid manipulation of the turn knob 50 which results in a step function turn command signal being introduced into the rudder channel. This signal, when applied to the rate channel 20 of the rudder amplified 22, rapidly positions the rudder 25 to provide rudder "rate-kick" explained previously.

The application of the present invention solves the aforementioned problems as well as the problem of turn exit co-ordination which will be described subsequently. With the configuration of the preferred embodiment of the present invention as shown in FIG. 1, upon initiating a turn command signal by positioning the turn knob 50, the turn command signal is applied to bank integrator 54 and to the primary of turn transformer 55. When the turn knob is positioned out of the detent position of detent cam 98, switch 102 is closed thus energizing time delay relay 99 in order that the contact arms 57 and 82 of the time delay relay 99 are immediately closed, thereby connecting the output of roll synchro 35 to the primary of bank transformer 58 and connecting the tap 81 to the control winding of turn generator 83. With this arrangement, the input to the turn co-ordination system is the sum of a portion of the turn command signal and a portion of the signal from the roll synchro 35 of vertical gyro 31. Since turn knob position commands a specific bank angle while at the same time commanding a certain turn rate at a certain airspeed and co-ordination modulator gain, in a manner to be described, it is possible to apportion the turn signal and roll signal so that the magnitude of the combined signal applied to turn motor amplifier 84 is equal to the turn signal when the airplane attains a constant turn rate, i.e., a steady state bank angle. Thus, for a step input turn command signal caused by turn knob manipulation, the input signal to the turn co-ordination system is the sum of a step input from turn potentiometer 51 and a ramp input from roll synchro 35, with the resulting steady state magnitude equal to the turn potentiometer voltage. The portions of the turn command and the roll voltages are selected to match the roll rate characteristics of the aircraft. The proper selection of these signals will assure co-ordination during turn entry and exit as well as minimizing rudder "rate-kick."

Continuing to refer to FIG. 1, the turn command signal on the primary of turn transformer 55 is coupled into the secondary 70 of transformer 55 and applied across voltage divider 72 consisting of resistors 74 and 78. Adjustable tap 77 shorts a selected portion of resistor 78 to change the voltage across resistor 78. This voltage across resistor 78 is applied across voltage divider 73. In a similar manner, the bank angle signal on the primary of bank angle transformer 58 is coupled to the secondary 60 of transformer 58 and applied across voltage divider 62 consisting of resistors 64 and 68. Adjustable tap 66 shorts a selected portion of resistor 68 to change the voltage across resistor 68. This voltage across resistor 68 is applied across voltage divider 63. In a manner to be described, co-ordination reference signal from co-ordination modulator 95 via tap 89 is combined at junction 65 with the bank angle signal. A preselected portion of both the co-ordination reference signal and the bank angle signal are applied across voltage divider 63 and taken off via tap 80. The output of tap 80 is applied across voltage divider 73 and combined with the turn command signal such that at tape 81 a preselected combination of the bank angle signal, turn command signal and co-ordiantion reference signal is applied via contact arm 82 to the control winding of turn generator 83 and thence to the input of turn motor amplifier 84.

The combined signal from turn motor amplifier 84 establishes a rotational speed for motor 85 and generator 83 which in turn drives the rotor of rudder synchro 17. The rotation of the rotor of rudder synchro 17 builds up a yaw flight signal which when applied to the rate and displacement channels 20 and 21, respectively, of the rudder amplifier 22 results in a deflection of the rudder 25. As the aircraft starts to turn in response to the yaw flight signal, the heading synchro 15, which is stabilized by directional gyro 10, will produce a signal which follows up or wipes out the rudder synchro signal, thereby keeping the average rudder deflection approximately zero during turns.

In the improved turn co-ordination system, automatic turn co-ordination is achieved by a co-ordination reference signal from the co-ordination modulator 95 in a manner to be described forthwith. Secondary winding 90 of turn transformer 55 provides a portion of the turn command signal to rectifier 91 while secondary winding 92 of bank angle transformer 58 provides a portion of the bank angle signal to rectifier 93. The rectified outputs from rectifiers 91 and 93 are fed to summing modulator 94 which combines and modulates the turn and bank signals and applies the combined signal to co-ordination modulator 95 to provide a reference voltage indicative of the magnitude of the turn and bank signal that is non-phase reversing regardless of the phase relation of the turn and bank signals. The reference signal applied to the co-ordination modulator 95 is therefore a constant phase A.C. signal. Rectifiers 91 and 93 with summing modulator 94 comprise dual modulator 103. For a more detailed discussion of the circuitry and operation of dual modulator 103 reference is made to FIG. 2.

As shown in FIG. 2, rectifiers 91 and 93 of dual modulator 103 may be of the bridge type. In bridge rectifier 91 there are four diodes 120, 121, 122, and 123 connected together. The negative electrode of diode 120 is connected via junction 124 to the positive electrode of diode 121. The negative electrode of diode 121 connected to the negative electrode of diode 122 via junction 125. The position electrode of diode 122 is connected at junction 126 to the negative electrode of diode 123. The positive electrode of diode 123 is connected at junction 127 to the positive of electrode of 120 to complete the bridge circuit. Similarly, bridge rectifier 93 is comprised of diodes 130, 131, 132 and 133. The positive electrode of diode 130 is connected to the negative electrode of diode 131 at junction 134. The positive electrode of diode 131 is connected via junction 135 to the positive electrode of diode 132. The negative electrode of diode 132 is connected to the positive electrode of diode 133 at junction 136. The negative electrode of diode 133 is connected to the negative electrode of diode 130 at junction 137 to complete the bridge circuit.

One end of secondary winding 90 of turn transformer 55 is connected to junction 124; the other end of secondary winding 90 is connected to junction 126. One end of secondary winding 92 of bank transformer 58 is connected to junction 134; the other end of secondary winding 92 is connected to junction 136. Junction 127 of bridge rectifier 91 is connected to junction 137 of bridge rectifier 93.

The summing modulator 94 of dual modulator 103 includes a ring modulator 140. Ring modulator 140 is comprised of a non-linear diode and a resistor in each arm thereof; the diodes 141, 142, 143 and 144 with limiting resistors 145, 146, 147 and 148 are connected such that the combination form a ring configuration type of modulator. The negative electrode of diode 141 is connected to the positive electrode of diode 142 at junction 150. The negative electrode of diode 142 is connected via resistor 146 to junction 151. The positive electrode of diode 143 is also connected to junction 151 via resistor 147. The negative electrode of diode 143 is connected to the positive electrode of diode 144 at junction 152. The negative electrode of diode 144 is connected via resistor 148 to junction 153. The positive electrode of diode 141 is also connected to junction 153 via resistor 145 to complete the bridge circuit. Connected to junctions 151 and 153 of ring modulator 140 is a suitable source of alternating potential 16. One end of resistor 154 is connected to junction 151. The other end of resistor 154 is connected via center tap 155 to resistor 156 which has its other end connected to junction 153. Resistors 154 and 156 provide a reference center tap 155 for the junction of the rectifier input signals and the A.C. reference signal in a manner to be described. Junction 135 of bridge rectifier 93 is connected to center tap 155 or ring modulator 140.

Junction 150 of ring modulator 140 is connected to one end of tuning capacitor 160 and to one end of the primary winding 161 of tuned output transformer 162. Junction 152 is connected to the other end of capacitor 160 and to the other end of primary winding 161. Junction 125 of bridge rectifier 91 is connected to the center tap 163 of primary winding 161. One end of secondary winding 164 of transformer 162 is connected to the co-ordination modulator 95 while the other end of winding 164 is connected to ground.

In the operation of the dual modulator 103, when there is no signal from either secondary 90 or secondary 92, the half-wave current flow through the upper portion of ring modulator 140 is through resistor 145, diode 141, diode 142 and resistor 146 which is identical to the current flow in the lower portion of ring modulator 140 through resistor 147, diode 143, diode 144 and resistor 148. Since each portion of the circuit conducts on a half-wave basis, there is no output signal developed across the transformer primary 161. If it is desired to raise the output signal under the above conditions to some nominal low value, the value of a resistor in the ring modulator 140, such as resistor 146, may be altered to provide the desired output.

When an A.C. turn command signal via secondary 90 is applied to bridge rectifier 91, the signal is rectified by diodes 120, 121, 122 and 123. This develops a D.C. potential with junction 125 the positive terminal and junction 127 the negative terminal. This D.C. potential produces a current flow through the summing modulator 94 as follows:

(a) Through the upper half of transformer primary 161, diode 142, resistor 146, resistor 154, diode 131, diode 130, diode 132 and diode 133.

(b) Through the lower half of transformer primary 161, diode 144, resistor 148, resistor 156, diode 131, diode 130, diode 132 and diode 133.

This flow of direct current through the dual modulator 103 produces dissimilar currents in the upper and lower portions of the ring modulator 140, thereby providing across the secondary 164 of transformer 162 an A.C. output signal of fixed phase or polarity but with an amplitude proportional to the turn command input signal.

An A.C. bank angle signal applied via secondary 92 to the input of bridge rectifier 93 produces an output signal having similar characteristics, i.e., having an amplitude in accordance with the amplitude of the applied bank angle signal but of a constant phase or polarity. In this case, the flow of direct current is the same as before with the exception of diodes 130, 131, 132 and 133, providing the rectification.

Since the A.C. input signals from secondaries 90 and 92 are converted to D.C. signals and the D.C. circuits consisting of bridge rectifiers 91 and 93 are connected in a series aiding circuit configuration, the rectified output signal produced from bridge rectifiers 91 and 93 will be additive regardless of the phase or polarity of the input turn command and bank angle signals.

Interaction between the input sources to bridge rectifiers 91 and 93 from secondaries 90 and 92, respectively, is prevented by the short circuit effect supplied by connecting the bridge rectifiers 91 and 93 across the secondaries 90 and 92.

The output of the dual modulator 103 connected to the co-ordination modulator 95 is an A.C. signal having an amplitude proportional to the sum of the bank angle and turn command signals without regard for the phase or polarity of said signals having a constant phase. The output polarity or phase is of fixed relation since the input signals are converted to D.C. and the D.C. potential can unbalance the modulator in only the desired direction. In other embodiments, as many input signals may be used as may be required, provided in each case an input source and a rectifier network is supplied.

Figure 3:
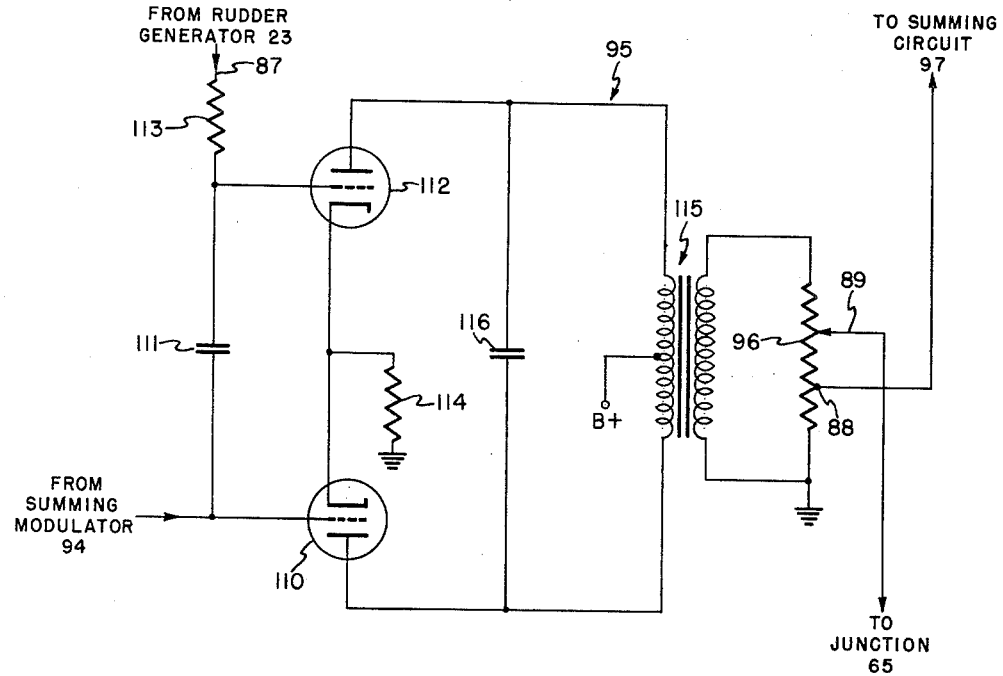

As shown in FIG. 1, the co-ordination modulator 95 also receives a D.C. signal from the rudder generator 23 known as the co-ordination signal that is applied via lead 87 in a manner more clearly seen with respect to FIG. 3. Referring now to FIG. 3, one embodiment of a co-ordination modulator 95 suitable for the present invention is shown herein. The output from summing modulator 94 is connected to the grid of triode 110 and via condensor 111 to the grid of triode 112. The output from rudder generator 23 is connected via lead 87 through resistor 113 to the grid of triode 112. The cathodes of triodes 110 and 112 are connected through dropping resistor 114 to ground. The plates of triodes 110 and 112 are connected across the primary of output transformer 115. A suitable positive potential is applied to the plates of tubes 110 and 112 via the center tap on the primary of transformer 115. A suitable tuning condenser 116 is connected across the primary of transformer 115. The secondary of transformer 115 is connected across voltage divider 96, one end of which is grounded. An output is taken via tap 88 of voltage divider 96 to summing circuit 97. A second output is taken via tap 89 of voltage divider 96 to junction 65.

The output from summing modular 94 is an alternating current reference signal having an amplitude corresponding to the combined turn and bank signal with a constant phase, as previously explained. This A.C. reference signal is applied to the grid of triode 110 and via condenser 111 to the grid of triode 112. The D.C. co-ordination signal from rudder generator 23 is applied via lead 87 through resistor 113 to the grid of triode 112 only, since it is precluded from appearing on the grid of triode 110 by condenser 111. Condenser 111 and resistor 113 form an R-C integrating network to provide stabilization of the D.C. signal from rudder generator 23 in order that triode 112 is not responsive to short period gusts. Thus, in a manner more fully explained in aforementioned Patent No. 2,567,922, the output of the coordination codulator 95 across voltage divider 96 is an alternating voltage output known as the co-ordination reference signal having an amplitude and phase corresponding respectively to the amplitude and polarity of the D.C. co-ordination signal from rudder generator 23. The amplitude of the co-ordination reference signal across voltage divider 96 is also made a function of the combined turn and bank signals. This may be accomplished effectively by operating the triodes on a non-linear portion of their characteristic curves and changing the gain of, for example, triode 112 by changing the bias point of the tube when a D.C. co-ordination signal is present.

As long as there is no D.C. co-ordination signal from rudder generator 23 received on the grid of triode 112 during a turn, the A.C. reference signal from summing modulator 94 is applied equally to the grids of triodes 110 and 112, resulting in a net output of zero from transformer 115. During a turn, when a co-ordination signal from rudder generator 23 is developed and applied to the grid of triode 112, the balanced output across transformer 115 is upset and a co-ordination reference signal from the secondary of transformer 115 is applied across voltage divider 96, portions of which are applied to turn motor amplifier 84 to change the speed of turn motor 85 in a manner to be described and to the rate channel 20 of rudder amplifier 22.

Referring again to FIG. 1, the output of the coordination modulator 95, known as the co-ordination reference signal, is applied across voltage divider 96. A preselected portion of the co-ordination reference signal is applied from tap 88 to the rate channel 20 of rudder amplifier 22 in repeatback fashion via summing circuit 97 for stabilization purposes in a manner more fully described in the aforementioned Patent No. 2,896,883. A preselected portion of the co-ordination reference signal across voltage divider 96 is also applied via adjustable tap 89 to junction 65 of combining means 67. During a turn, when rudder generator 23 develops an output signal the co-ordination modulator 95 applies a proportional co-ordination reference signal that is a measure of the misco-ordination to the turn motor amplifier 84 via combining means 67 to drive the turn motor 85 thereby changing the speed of the rotor of rudder synchro 17 to provide an error signal that corrects the position of rudder 25 in a direction to co-ordinate the turn. This establishes the proper rate of change of heading for the instant bank angle and airspeed until the rudder generator voltage is zero. This produces a co-ordinated turn since one definition of a co-ordinated turn is one where for a given bank angle there is zero rudder angle.

Upon returning the turn knob 50 to the detent position at the end of the turn maneuver to effect a roll-out, switch 102 is opened, deenergizing time delay relay 99, however, the time delay feature of relay 99 maintains the contact arms 57 and 82 in a closed position for a predetermined time interval, for example, 10 seconds. By so doing, the output of the roll synchro 35 remains connected to the input of turn motor amplifier 84 to drive the turn motor 85 and position rudder 25 to maintain co-ordination until the turn exit is completed and the aircraft is in a wings-level position. If this were not done, there would be no signal applied to the turn motor amplifier 84 and the ultimate heading of the aircraft would be determined by the coast time of the turn motor 85 and generator 83. The output of roll synchro 35 also remains connected to co-ordination modulator 95. By maintaining the roll signal or roll gyro 35 effective during this time, a smooth turn exit is accomplished. There is no signal being applied from the turn command potentiometer 51 since it is in a null condition when the turn knob 50 is in a detent position.

After the predetermined time delay, when the contact arms 57 and 82 are opened with the aircraft in a wings-level condition, the turn motor amplifier 84, turn motor 85, turn generator 83 and rudder synchro 17 may be put in a follow-up condition by connecting the output of synchro 17 to the input of the turn motor amplifier 84 by moving the rudder engage knob 100 to the "disengage" position thereby maintaining the turn motor system synchronized in order to avoid transients when a turn is again initiated. The automatic pilot of the present invention has the usual interlocks and relays for transferring from one mode of operation to another that have not been shown for purposes of simplification.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In an automatic pilot for aircraft having heading and bank references, means for producing signals having an amplitude and phase corresponding to the amplitude and sense of the deviation of the craft from a predetermined heading and bank attitude, servo means controlled by said signals for applying the restoring moments to the aircraft in turn and bank, automatic turn co-ordination means comprising means under manual control for applying primary signals to each of said servo means to cause a predetermined bank in a turn at a proportional rate, means constructed and arranged to furnish a second signal responsive to misco-ordination of the aircraft, means for algebraically adding said second signal to one of said primary signals in a sense to eliminate said misco-ordination, means for increasing the magnitude of the second signal as a function of one of said primary signals, and means for maintaining said bank angle signals effective after said turn signal is rendered ineffective.

2. In an aircraft automatic pilot, command means for initiating a turn and for producing a turn signal indicative of the desired bank angle, means for providing a signal representative of the actual bank angle of the craft, aileron controlling means responsive to said turn and actual bank angle signals, a heading indicator connected through differential means to a rudder controlling means, a turn motor connected to said differential means, control means connected to operate said turn motor, said turn motor control means being operated in accordance with the algebraic summation of said turn signal, actual bank angle signal and the output of said rudder control means.

3. In an aircraft automatic pilot of the character described in claim 2 wherein said last-mentioned means includes delay means whereby said turn motor control means remains responsive to said bank angle signal for a predetermined interval after said command means has been rendered ineffective.

4. In an aircraft automatic pilot of the character described in claim 2 wherein said last-mentioned means includes means for applying said signal representative of actual bank angle to said turn motor control means only when the aircraft is endeavoring to effect a co-ordinated turn.

5. An aircraft automatic pilot turn control, command means for initiating a desired turn, means responsive to said command means for providing a turn signal in accordance therewith, means for smoothing said turn signal, aileron servomotor and control means therefor responsive to said smoothed turn signal for banking said craft in accordance therewith, means responsive to the banking of the craft for providing a roll signal proportional thereto, means for combing preselected proportions of said turn and roll signals and providing an output in accordance therewith, turn motor means responsive to said combined output for providing an output in accordance therewith, a rudder servomotor and control means therefor responsive to the output from said turn motor and adapted for positioning the rudder in accordance therewith, means for providing a signal corresponding to sideslip or skid of the craft in the turn, means for applying said last mentioned signal in a compensating fashion to said turn motor means, and means including time-delay actuated switching means for rendering said turn motor means responsive to said roll signal for a predetermined interval after said turn signal has been discontinued.

6. An aircraft automatic pilot turn control, command means for initiating a desired turn, means responsive to said command means for providing a turn signal in accordance therewith, means for smoothing said turn signal, aileron servomotor and control means therefor responsive to said smoothed turn signal for banking said craft in accordance therewith, means responsive to the banking of the craft for providing a roll signal proportional thereto, means for combining preselected proportions of said turn and roll signals and providing an output in accordance therewith, turn motor means responsive to said combined output for providing an output in accordance therewith, rudder servomotor and control means therefor responsive to the output from said turn motor and adapted for positioning the rudder in accordance therewith, means for providing a signal corresponding to sideslip or skid of the craft in the turn, means for applying said last mentioned signal in a compensating fashion to said turn motor means, and means including time-delay actuated switching means for continuing to render said turn motor responsive to the roll signal for a predetermined time delay after said command means has been rendered inoperative.

7. In an automatic pilot for aircraft having a servomotor operable to bank the craft and a servomotor operable to change the heading of the craft; a manually settable turn control means, a first signal generator operated by said turn control means for supplying a turn signal, means for supplying said turn signal to said bank servomotor to cause the craft to bank and turn, means for providing a signal corresponding to the bank of the craft, means for providing a signal corresponding to the miscoordination of the craft in turn, turn motor means responsive to a preselected ratio of said turn and bank signals compensated by said miscoordination signal for providing an output in accordance therewith, means for providing the output of said turn motor to said heading servomotor to maintain the craft in a coordinated turn and means for modifying said miscoordination signal in accordance with the turn and bank signals.

8. In an automatic pilot for aircraft having a servomotor operable to bank the craft and a servomotor operable to change the heading of the craft; a manually settable turn control means, a first signal generator operated by said turn control means for supplying a turn signal, means for supplying said turn signal to said bank servomotor to cause the craft to bank and turn, means for providing a signal corresponding to the bank of the craft, means for providing a signal corresponding to the miscoordination of the craft in turn, turn motor means responsive to a preselected ratio of said turn and bank signals compensated by said miscoordination signal for providing an output in accordance therewith, means for providing the output of said turn motor to said heading servomotor to maintain the craft in a coordinated turn, means for modifying said miscoordination signal in accordance with the turn and bank signals, and means for connecting a portion of said miscoordination signal to said heading servomotor for purposes of stabilization.

References Cited in the file of this patent

UNITED STATES PATENTS

| | | |
|---|---|---|
| 2,553,597 | Maroni | May 22, 1951 |
| 2,597,789 | McGoldrick | May 20, 1952 |
| 2,619,623 | Meredith | Nov. 25, 1952 |
| 2,682,640 | Harling | June 29, 1954 |
| 2,686,021 | Halpert | Aug. 10, 1954 |
| 2,700,135 | Tolles | Jan. 18, 1955 |
| 2,827,250 | Rusler | Mar. 18, 1958 |
| 2,829,848 | Tribken et al. | Apr. 8, 1958 |